/

US009432296B2

(12) United States Patent
Pressley

(10) Patent No.: US 9,432,296 B2
(45) Date of Patent: Aug. 30, 2016

(54) SYSTEMS AND METHODS FOR INITIALIZING PACKET TRANSFERS

(71) Applicant: Circadence Corporation, Boulder, CO (US)

(72) Inventor: Ryan Lucas Pressley, Saltillo, MS (US)

(73) Assignee: Circadence Corporation, Boulder, CO (US)

( * ) Notice: Subject to any disclaimer, the term of this patent is extended or adjusted under 35 U.S.C. 154(b) by 131 days.

(21) Appl. No.: 14/319,094

(22) Filed: Jun. 30, 2014

(65) Prior Publication Data

US 2015/0003245 A1 Jan. 1, 2015

Related U.S. Application Data

(60) Provisional application No. 61/841,798, filed on Jul. 1, 2013.

(51) Int. Cl.
*H04L 12/807* (2013.01)
*H04L 12/26* (2006.01)
*H04L 12/851* (2013.01)
*H04L 12/841* (2013.01)
*H04L 12/801* (2013.01)

(52) U.S. Cl.
CPC ........... *H04L 47/27* (2013.01); *H04L 43/0864* (2013.01); *H04L 43/0894* (2013.01); *H04L 47/24* (2013.01); *H04L 47/28* (2013.01); *H04L 47/29* (2013.01)

(58) Field of Classification Search
CPC ..... H04L 1/187; H04L 12/569; H04L 47/27; H04L 47/28; H04L 47/283; H04L 47/37
See application file for complete search history.

(56) References Cited

U.S. PATENT DOCUMENTS

| 7,127,518 | B2 | 10/2006 | Vange et al. |
| 7,155,539 | B2 | 12/2006 | Vange et al. |
| 8,024,481 | B2 | 9/2011 | Thornton et al. |
| RE45,009 | E | 7/2014 | Vange et al. |
| 2007/0165531 | A1* | 7/2007 | Labrador ................ H04L 47/27 370/235 |
| 2008/0037420 | A1* | 2/2008 | Tang ....................... H04L 1/187 370/229 |
| 2014/0289381 | A1 | 9/2014 | Morton et al. |

* cited by examiner

*Primary Examiner* — Pao Sinkantarakorn
(74) *Attorney, Agent, or Firm* — Weide & Miller, Ltd.

(57) ABSTRACT

A method of initiating a new data transfer across a network, such as across a persistent network having historical data transfer performance information, is disclosed. Other embodiments of the invention comprise networks which implement methods of the invention. In accordance with one aspect of the invention, functional adjustments are made to an initial data window based upon an analysis of a historical data transfer performance and idle time since a last data transfer.

23 Claims, 2 Drawing Sheets

SYSTEMS AND METHODS FOR INITIALIZING PACKET TRANSFERS

RELATED APPLICATION DATA

This application claims priority to U.S. Provisional Application Ser. No. 61/841,798, filed Jul. 1, 2013.

FIELD OF THE INVENTION

The present invention relates generally to computer networks, and more particularly to systems and methods for initializing packet transfers using computer networks.

BACKGROUND OF THE INVENTION

The state of a network may be highly dynamic due to extrinsic effects such as competing traffic and intrinsic channel effects such as round-trip time variation and bandwidth oscillation from multi-path networks or fading. Furthermore, actors within a network operate under a constrained knowledge of the current state of the network relative to their current available or allocated bandwidth due to the dynamic nature of the system. Actors must rely on delayed feedback from a connection to infer the current status and make decisions on future actions—this is commonly referred to as network congestion control. Congestion control is commonly broken into multiple phases including an initial probe phase, congestion avoidance, and recovery mode where a congestion window is defined and updated to signify the allowed amount of outstanding data on a connection. The initial probe phase requires the capability to quickly achieve the current allocated bandwidth of the channel while minimizing packet loss in order to maximize performance of the transfer. Small files, such as those often found in hypertext transport protocol (HTTP) traffic, will commonly not exit the initial phase and therefore their performance depends strictly upon the efficiency of the initial phase. Additionally, congestion avoidance typically involves small increments relative to the initial phase, and therefore the ability to correctly estimate the optimal congestion window will affect the performance of the whole transfer.

The current state of the art methods for transfer initialization are generally variations of the transmission control protocol (TCP) slow start algorithm (see RFC 5681). TCP slow-start is specified to be used for new connections and to restart idle connections. The slow start algorithm is inefficient under certain environments and can induce several problematic conditions:

a) High latency—either in the completion times of small files relative to the bandwidth product of the network or in back-to-back transfers which maintain a large congestion window relative to the bandwidth delay product of the network inducing queuing delay.

b) Inefficient utilization of bandwidth—the time t for slow-start to reach maximum utilization where band is the available network bandwidth is:

$$t = \log_2(\text{band}) \quad \text{(Eq. 1)}$$

Time t represents the number or round trip time periods in which the channel is underutilized. This is especially relevant in small file transfers or networks consisting of large inherent latencies.

c) High loss—slow start utilizes an exponential growth function, which means that up to half of the outstanding packets in the congestion window may be lost when congestion occurs.

TCP Fast Start is a variation of TCP slow start geared towards improving short transfers as is often the case in HTTP web traffic. TCP Fast Start utilizes previous TCP connection state information to initialize new connections. However, it relies upon a bottleneck router utilizing TCP/Internet Protocol (IP) header prioritization options and assumes an extended optimistic stability to the available bandwidth.

Limited Slow-Start is an experimental technique which defines modifications to TCP slow start to limit the increment over some predefined static threshold by a linearly decreasing function. This modification only addresses the potential high loss rates in slow start and its effectiveness is dependent upon an accurate threshold value being set; setting the value too low may result in significant underutilization of the channel.

Hybrid Slow Start uses heuristic metrics to attempt to terminate TCP slow start early and avoid high loss rates. Hybrid Slow Start uses inter-arrival times of acknowledgement (ACK) packets to infer the network bandwidth and therefore requires high clock precision and is susceptible to performance degradation under asymmetric networks.

User datagram protocol (UDP)-based Data Transfer protocol's (UDT) native congestion control algorithm utilizes packet-pair estimates to set the outgoing packet rate during session initiation. Packet-pair estimates have been shown to be unreliable under certain constraints requiring significant heuristic-based classification.

Web browsers typically multiplex domain requests over multiple TCP sessions to speed up initial download speeds and minimize latency of web requests. However, this will induce several instances of TCP's slow start algorithm potentially resulting in high loss rates for larger transfers. Additionally, this does not address the fundamental problem of efficiently adjusting to the allocated channel bandwidth.

Accordingly, there is a need for systems and methods for initializing packet transfers that efficiently utilize available bandwidth.

SUMMARY OF THE INVENTION

Embodiments of the invention comprise a method of initiating a new data transfer across a network, such as across a persistent network having historical data transfer performance information. Other embodiments of the invention comprise networks which implement methods of the invention. In accordance with one aspect of the invention, functional adjustments are made to an initial data window based upon an analysis of a historical data transfer performance and idle time since a last data transfer.

One embodiment of the invention comprises a method of initiating a new data transfer across a persistent network having historical data transfer performance information. The method comprises the steps of: (1) identifying, at a transmitting end of the persistent network, an entropy in connection with one or more connection metrics, the entropy is based on an amount of time since a last transfer across the persistent network; (2) adjusting, at the transmitting end of the persistent network, a congestion window for the new data transfer based on a selected one of a plurality of adjustment states, a different adjustment is associated with each adjustment state of the plurality, the adjusting comprising: (a) in a first adjustment state where the identified entropy satisfies an entropy threshold and an available bandwidth estimate satisfies an available bandwidth threshold, adjusting the congestion window in accordance with a maximum receive rate and a round trip time; and (b) in a second adjustment state where the identified entropy satisfies the entropy threshold and a queuing delay estimate satisfies a queuing delay threshold, adjusting the congestion window in accordance with a receive rate and a minimum round trip time; (3) in a third adjustment state where the identified entropy exceeds the entropy threshold, adjusting the congestion window in accordance with a short-term receive rate and a minimum round trip time and further adjusting the congestion window as a function of the identified entropy; and (4) using, at the transmitting end of the persistent network, the adjusted congestion window for the new data transfer.

Further objects, features, and advantages of the present invention over the prior art will become apparent from the detailed description of the drawings which follows, when considered with the attached figures.

DETAILED DESCRIPTION OF THE INVENTION

The systems and methods described herein provide a novel procedure for initializing packet transfers over a persistent connection. Through enabling the collection of available throughput estimation data from the receiving end of the transfer, the sender is able to construct the performance of previous transfers as a function of time. Through temporal contextual awareness with respect to the throughput performance history, the sender is able to optimize a new transfer initialization. The subject matter includes the differential collection of throughput estimation data to classify the available bandwidth and the functional adjustment to the initial window based upon an analysis of the historical performance and the idle time since the last transfer.

The systems and methods described herein, sometimes called the intelligent drop system, set the initial state of a new transfer based upon the historical context of the connection performance. Multiple metrics are measured directly from the connection utilizing the end-to-end nature of the transport. Some metrics may be collected from the remote endpoint or receiver. Upon initialization, the intelligent drop system enters into one of three states based upon the time since the last transfer. These states represent the accuracy of the systems knowledge with respect to the current network state.

Figure 1:
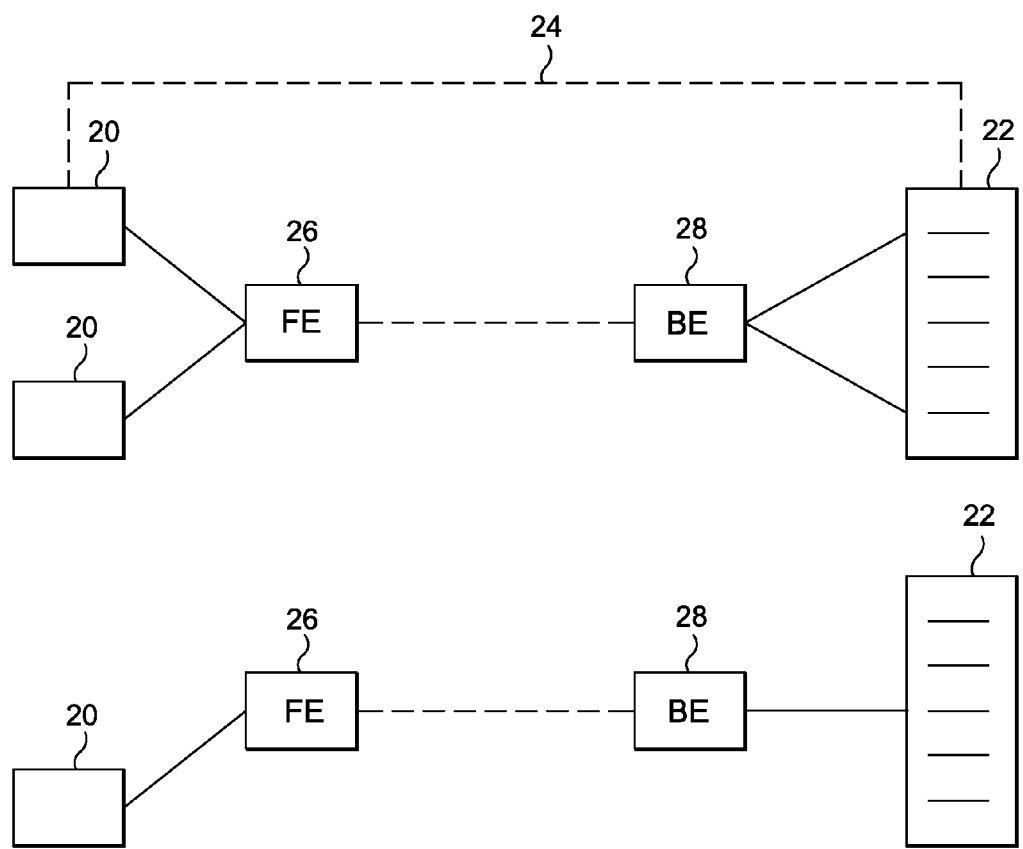
FIG. 1 illustrates an example environment of the present invention.
Figure 2:
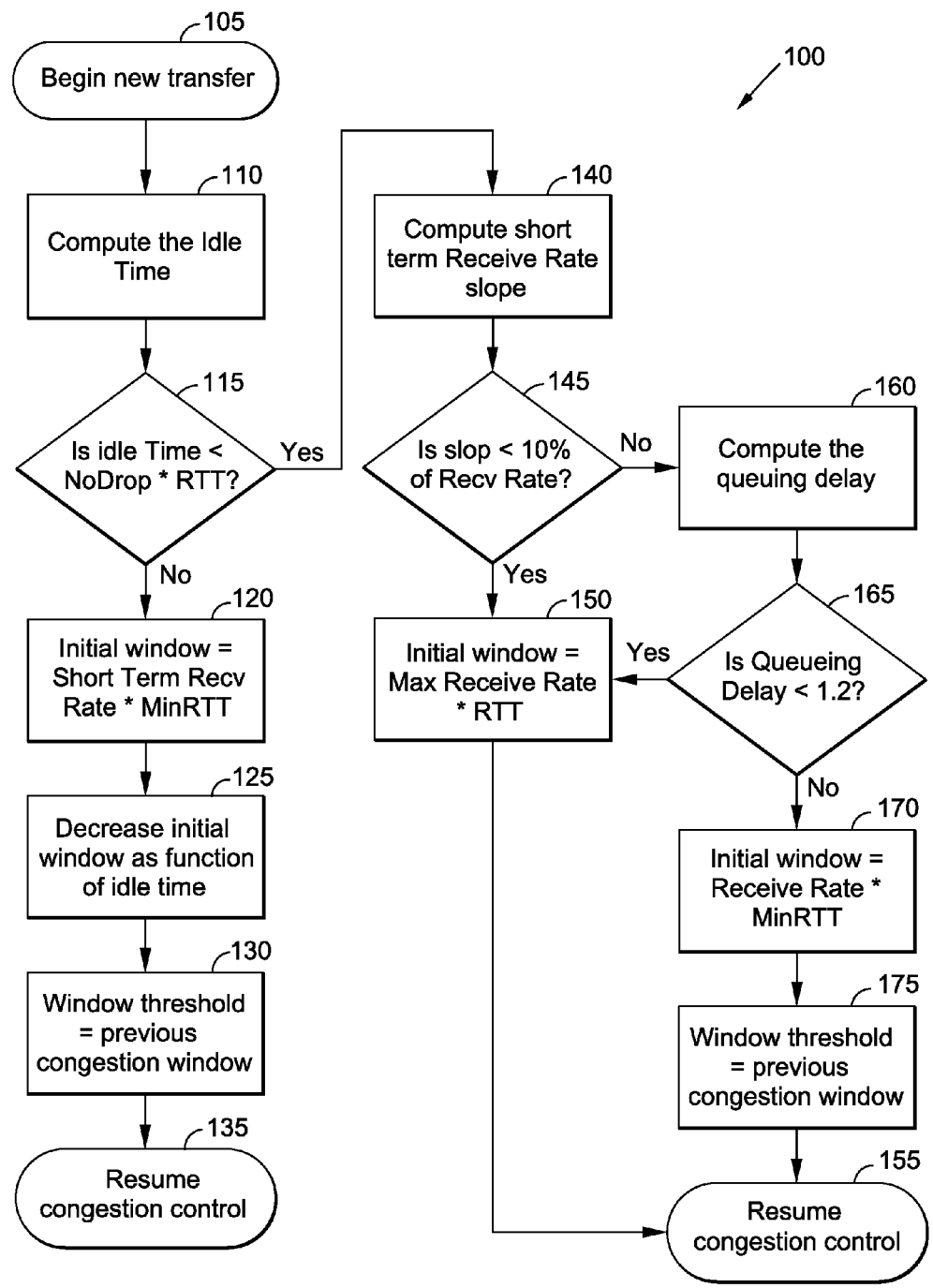
FIG. 2 is a flow chart of an exemplary method for initializing a packet transfer in accordance with the description herein.

In some embodiments, the intelligent drop system may be used relative to a communication system or network which comprises one or more communication links between computing or communication devices. Such computing or communication devices may comprise, for example, client computers, web servers and client communication devices such as PDAs or smart phones. Communications between the computing devices may be facilitated across one or more network links (which may be wired and/or wireless) by and between associated front end and back end mechanisms (such as hardware and/or software). For example, FIG. 1 illustrates one environment where the invention may be implemented. As illustrated therein, the environment comprises one or more first computing devices 20. The first computing devices 20 may comprise, but are not limited to, a client computing or communication device. The environment also includes one or more second computing devices 22. The second computing devices 22 may comprise, but are not limited to, a remote web server. In one embodiment, communication may occur between the first computing device 20 and the second computing device 22, such as over one or more network or communication links 24 (which as indicated above, may be wired and/or wireless). The communications may comprise, for example, the exchange of data, such as in the form of packets.

As further illustrated in FIG. 1, one or more front end mechanisms 26 (which mechanisms may comprise hardware, software or a combination thereof, including running on the first computing device(s) 22) may be associated with the one or more first computing devices 20 and one or more back end mechanisms 28 (which again may comprise hardware, software or a combination thereof) may be associated with the one or more second communication devices 22. The first and second computing devices 20, 22 may be configured to transmit and receive data in a first type or protocol, such as TCP. On the other hand, data may be transmitted between the front and back end mechanisms 26, 28 according to one or more enhanced protocols which differ from the protocols which the computing or communication devices utilize to receive and transmit data. Such an enhanced protocol may comprise the transport morphing protocol (TMP) developed by Circadence Corporation. Such a system and the enhanced TMP communication protocol is described in U.S. Pat. No. 7,127,518, issued Oct. 24, 2006, which is hereby incorporated herein by reference in its entirety. TMP provides a reliable end-to-end communication protocol between hosts within a packet network. It utilizes UDP/IP to deliver long-term connectivity between gateway nodes in order to facilitate multiple independent data transfers. As such, it provides the capability to maintain characteristics and measurements of past transfer performance over the lifetime of a connection. And although TMP is used as an example throughout, any protocol or system may be used that provides connection metrics as described herein.

TMP uses an additive increase/multiplicative decrease function based upon TCP to adjust a congestion window used to limit the amount of outstanding traffic on the network. Upon initialization of a TMP connection, an exponential growth function is used to increase the congestion window similar to TCP's slow start. Upon loss detection, a congestion avoidance state is entered. In accordance with the present invention, the intelligent drop system may be used in accordance with a communication system utilizing TMP (or in other communication systems or networks). In particular, relative to a communication system utilizing a TMP connection, upon subsequent transfers, the intelligent drop system may be utilized to adjust the initial window size and adjust the length of the initial growth function.

In one embodiment, the intelligent drop system sets a maximum threshold value on the congestion window at which point congestion avoidance is entered.

Upon initialization, a new transfer enters into one of three states based upon the following metrics which may be provided by TMP or otherwise:

round trip time (rtt)—a weighted average measure of round trip packet latencies;

minimum round trip time (MinRTT)—the minimum round trip time experienced by the connection;

receive rate—a short-term and long-term convergent estimate of the available data rate as seen by the receiver; measured only when the data rate is estimated to be at the maximum available rate;

the short-term rate is an average over the past two round trip times of the receive rate feedback samples;

the long-term rate is an average over the last ten seconds of receive rate feedback samples;

maximum receive rate (MaxRecvRate)—the maximum value as calculated over the last ten seconds;

maximum short-term receive rate (MaxShortTermRecvRate)—the maximum value as shored in the short term receive rate;

idle time (idleTime)—the elapsed time period since the last full congestion window (i.e., the time estimate of the last accurate receive rate signal);

congestion window (cwnd)—the current available size of outstanding packets on the network;

threshold (thrsh)—when the congestion window exceeds this amount, congestion avoidance is entered;

Drop Period (IDropPeriod)—set to 100 milliseconds; defines the period in which one initial window decrement occurs;

Maximum Segment Size (MSS)—The largest supported data size of a TCP packet to avoid fragmentation; and Maximum Threshold (max_sst)—The largest value the thrsh variable can take, set to an arbitrarily high value.

In addition, the slope of the short-term receive rate and current queuing delay may be utilized. The slope is calculated as a linear least squares regression estimate:

$$\text{slope} = r * \frac{\sigma_X}{\sigma_Y} \qquad \text{(Eq. 2)}$$

$$r = \frac{\text{Cov}(X, Y)}{\sigma_X * \sigma_Y} \qquad \text{(Eq. 3)}$$

The variable r represents a sample correlation constant (e.g., Pearson's coefficient), σ represents the standard sample deviation, and Cov is the covariance between the two variables X and Y, the index of and the value of the short term receive rate respectively.

The current queuing delay is a ratio defined as:

$$\frac{rtt}{MinRTT} \qquad \text{(Eq. 4)}$$

The first two states of intelligent drop occur within a value NoDropPeriod*rtt of the last packet send time where NoDropPeriod is a configurable value defaulting to two. Within this time period, the state of the channel may be assumed to be reasonably similar to when TMP was last active. Intelligent drop will therefore not penalize the initial window and set it to a value that will achieve the current measured throughput of the channel. Defining the NoDropPeriod as a value of two (2) results in one round trip period, or one congestion window period, in which no feedback from the network is received during an idle period.

The third state occurs when the last packet send time is greater than NoDropPeriod*rtt in the past. In this state, intelligent drop assumes increasing system entropy as a function of time in the network state. Therefore it will penalize the initial window of the transfer based upon this degradation of knowledge. A final constraint is that intelligent drop will not set the initial window at any point greater than the last congestion window value. During this state the initial window is logarithmically decreased as a function of the idle period time whereas the threshold is increased linearly as:

$$l.e.t. = \log\left(\frac{idleTime}{IDropPeriod} + 1\right) \qquad \text{(Eq. 5)}$$

$$cwnd = \max\left(MSS*2, \frac{MaxShortTermRecvRate*MinRTT}{l.e.t.+1}\right) \qquad \text{(Eq. 6)}$$

$$thrsh = \min(max\_sst, \max(cwnd * idleTime, thrsh)) \qquad \text{(Eq. 7)}$$

The variable l.e.t. defines the logarithmic elapsed time used to decrement the initial window computed as a function of the idle time in Eq. 5. The constant IDropPeriod acts to prolong the initial decrement values over several round trip periods and has a marginal effect as the idle time increases. The l.e.t. is subsequently used to decrement the initial window and increase the initial threshold value in Eqs. 6 and 7 respectively. The initial window is set to the minimum of the default initial window size for a new connection defined as two TCP segment sizes so as to not penalize the initial window and effectively restart the initial probe process after long idle periods.

The first state is entered when the time of the last packet sent time is less than a value NoDropPeriod*rtt in the past and a determination that the current cwnd may not fully utilize the pipe is made. This later decision is true when the slope of the short-term receive rate is less than 10% of the short-term receive rate or the queuing delay is a value less than 1.2. In this case, a higher initial window is preferred with a larger risk of loss. The initial window is calculated as:

$$cwnd=\min(MaxRecvRate*MinRTT,cwnd) \qquad \text{(Eq. 8)}$$

The second state occurs if the last packet sent time is less than a value NoDropPeriod*rtt in the past and a determination has been made that the pipe has been fully utilized. The initial window is calculated as:

$$cwnd=\min(MaxShortTermRecvRate*MinRTT,cwnd) \qquad \text{(Eq. 9)}$$

FIG. 1 illustrates an exemplary flowchart 100 for initializing a packet transfer using the systems and methods described herein. In step 105, a new packet transfer is commenced. In step 110, the idle time (i.e., the time elapsed since the last full congestion window) is determined. In step 115, it is determined whether the idle time (determined in step 110) is less than the product of a pre-determined factor (i.e., NoDropPeriod) times a weighted average measure of round trip packet latencies (i.e., rtt). If the answer in step 115 is yes, the process continues with the assumption that the available connection metrics are still accurate measures from which the packet transfer can be initialized. Otherwise, the metrics may be assumed to be out-of-date and so their impact on initialization can be reduced as a function of time.

If the answer in step 115 is no, the process continues to step 120, where the initial window is set to the product of the short-term receive rate (as defined above) times the minimum round trip time (i.e., MinRTT). In step 125, the initial window is decreased as a function of idle time using Eqs. 5 and 6. In step 130, the window threshold is set to the previous congestion window. In step 135, normal congestion control is resumed.

If the answer in step 115 is yes, the process continues to step 140 (following transition A). In step 140, the short term receive rate slope is determined using Eq. 2. In step 145, it is determined whether the slope (determined in step 140) is less than 10% of the short-term receive rate.

If the answer in step 145 is yes, the initial window, in step 150, is set to the max receive rate (i.e., MaxRecvRate) times the round trip time (i.e., rtt). In step 155, normal congestion control is resumed.

If the answer in step 145 is no, the queuing delay is determined in step 160 using Eq. 4. In step 165, it is determined whether the queuing delay is less than 1.2. If the answer in step 165 is yes, the process continues to step 150 and on to step 155.

If the answer in step 165 is no, the initial window is set, in step 170, to the product of the receive rate (i.e., the convergent estimate of short-term and long-term rates) times the minimum round trip time (i.e., MinRTT). In step 175, the window threshold is set to the previous congestion window. In step 155, normal congestion control is resumed.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The intelligent drop system has a number of advantages over existing methods for data transfer initialization. Measurements of the intelligent drop system over a wired connection (stable) show a 143% improvement for individual file throughputs, which are smaller than the bandwidth delay product of the network. Additionally over cellular networks, typically consisting of more implicit channel variation, an average increase of 100% was seen over all file sizes tested. These measurements were taken compared to the previous system of transfer initialization based upon TCP's slow start.

It will be appreciated that the above embodiments that have been described in particular detail are merely example or possible embodiments, and that there are many other combinations, additions, or alternatives that may be included.

Also, the particular naming of the components (including, among other things, engines, layers, and applications), capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "identifying" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. One or more processors may be programmed or configured to execute any of the computer-executable instructions described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of initiating a new data transfer across a persistent network having historical data transfer performance information, comprising the steps of:

identifying, at a transmitting end of the persistent network, an entropy in connection with one or more connection metrics, the entropy is based on an amount of time since a last transfer across the persistent network;

adjusting, at the transmitting end of the persistent network, a congestion window for the new data transfer based on a selected one of a plurality of adjustment states, a different adjustment is associated with each adjustment state of the plurality, the adjusting comprising:

in a first adjustment state where the identified entropy satisfies an entropy threshold and an available bandwidth estimate satisfies an available bandwidth threshold, adjusting the congestion window in accordance with a maximum receive rate and a round trip time; and in a second adjustment state where the identified entropy satisfies the entropy threshold and a queueing delay estimate satisfies a queueing delay threshold, adjusting the congestion window in accordance with a receive rate and a minimum round trip time; and in a third adjustment state where the identified entropy exceeds the entropy threshold, adjusting the congestion window in accordance with a short-term receive rate and a minimum round trip time and further adjusting the congestion window as a function of the identified entropy; and using, at the transmitting end of the persistent network, the adjusted congestion window for the new data transfer.

2. The method of claim 1, further comprising:
in the second and third adjustment states, setting a congestion window threshold equal to a previous congestion window setting.

3. The method of claim 1, further comprising:
receiving, at transmitting end of persistent network, at least one of the one or more connection metrics from a receiving end in the persistent network.

4. The method of claim 1, further comprising:
using short-term receive rate estimate as the available bandwidth estimate; and
using a receive rate percentage as the available bandwidth threshold.

5. The method of claim 4, the receive rate percentage used for the available bandwidth threshold comprising a short-term and long-term convergent estimate of an available data rate.

6. The method of claim 4, the short-term receive rates slope estimate comprises a linear least squares regression estimate of the short-term receive rate.

7. The method of claim 1, further comprising:
using a ratio of the round trip time to the minimum round trip time as the queueing delay estimate.

8. The method of claim 1, further comprising:
using a multiple of the round trip time as the entropy threshold.

9. The method of claim 8, the multiple is used to control a timing for entering the third adjustment state.

10. A method of initiating a new data transfer across a persistent network having historical data transfer performance information, comprising the steps of:
making a first determination, at a transmitting end of the persistent network, whether to accept one or more existing connection metrics as accurately measuring a persistent network's state, the first determination using an idle time of the persistent network;
determining, at a transmitting end of the persistent network, a first setting for an initial congestion window for a new data transfer using the first determination that accepts the one or more existing connection metrics as accurately measuring the persistent network's state and a second determination whether a current congestion window is efficiently using available bandwidth of the persistent network;
determining, at a transmitting end of the persistent network, a second setting for the initial congestion window for the new data transfer based on the first determination that accepts the one or more existing connection metrics as accurately measuring the persistent network's state, the second setting is based on at least a third determination, which differs from said second determination, as to whether the current congestion window is efficiently using the available bandwidth of the persistent network;

determining, at a transmitting end of the persistent network, a third setting for the initial congestion window for the new data transfer based upon the first determination that rejects the one or more existing connection metrics as accurately measuring the persistent network's state, the third setting is determined by decreasing a determined initial congestion window logarithmically as a function of the idle time; and
initiating, at a transmitting end of the persistent network, the new transfer using the initial adjusted congestion window.

11. The method of claim 10, further comprising:
receiving, at the transmitting end of persistent network, at least one of the one or more existing connection metrics from a receiving end of the persistent network.

12. The method of claim 10, making a first determination further comprising:
making the first determination that accepts the one or more existing connection metrics as accurately measuring the persistent network's state where the idle time is less than a multiple of a weighted average measure of round trip packet latencies; and
making the first determination that rejects the one or more existing connection metrics as accurately measuring the persistent network's state where the idle time is at least equal to the multiple of the weighted average measure of round trip packet latencies.

13. The method of claim 12, the multiple operates to postpone using the third setting of the initial configuration window.

14. The method of claim 10, further comprising:
using a slope of a short-term receive rate as the short-term receive rate accuracy; and
using a percentage of an available bandwidth estimate.

15. The method of claim 14, the available bandwidth estimate comprises a short-term and long-term convergent available bandwidth estimate.

16. The method of claim 14, further comprising:
receiving the available bandwidth estimate from a receiving end of the persistent network.

17. The method of claim 14, the slope comprises a linear least squares regression estimate of the short-term receive rate.

18. The method of claim 10, determining the first setting for the initial congestion window further comprising:
determining the first setting for the initial congestion window using a maximum receive rate and a round trip time.

19. The method of claim 10, further comprising:
determining a queueing delay; and
making the third determination using the determined queueing delay and a queueing delay threshold.

20. The method of claim 10, determining a third setting for the initial congestion window for the new data transfer further comprising:
determining the third setting for the initial congestion window using a receive rate and a minimum round trip time.

21. The method of claim 20, further comprising:
setting a congestion window threshold equal to a previous congestion window setting.

22. The method of claim 20, determining a third setting for the initial congestion window further comprising:
determining the initial congestion window using a short term receiving rate and a minimum round trip time; and
decreasing the determined initial congestion window logarithmically as a function of the idle time.

23. The method of claim 22, further comprising:
setting a congestion window threshold equal to a previous congestion window setting.

\* \* \* \* \*